United States Patent
Guan et al.

(10) Patent No.: US 8,023,231 B2
(45) Date of Patent: Sep. 20, 2011

(54) COMPOSITE SHIELD STRUCTURE OF PMR WRITER FOR HIGH TRACK DENSITY

(75) Inventors: Lijie Guan, San Jose, CA (US); Moris Dovek, San Jose, CA (US); Joe Smyth, Aptos, CA (US); Yoshitaka Sasaki, Santa Clara, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 12/807,173

(22) Filed: Aug. 30, 2010

(65) Prior Publication Data

US 2010/0328816 A1    Dec. 30, 2010

Related U.S. Application Data

(63) Continuation of application No. 11/787,016, filed on Apr. 13, 2007, now Pat. No. 7,804,666.

(51) Int. Cl.
   *G11B 5/127*     (2006.01)
(52) U.S. Cl. ........................................ 360/319
(58) Field of Classification Search ............... 360/122, 360/123.37, 123.58, 125.13, 125.14, 125.15, 360/319
   See application file for complete search history.

(56) References Cited

U.S. PATENT DOCUMENTS

| | | | |
|---|---|---|---|
| 6,842,313 B1 | 1/2005 | Mallary | |
| 7,002,775 B2 | 2/2006 | Hsu et al. | |
| 7,068,453 B2 | 6/2006 | Terris et al. | |
| 7,070,698 B2 | 7/2006 | Le | |
| 7,322,095 B2 * | 1/2008 | Guan et al. | 29/603.07 |
| 7,872,835 B2 * | 1/2011 | Guan | 360/319 |
| 2008/0253035 A1 * | 10/2008 | Han et al. | 360/319 |
| 2008/0273276 A1 | 11/2008 | Guan | |
| 2008/0297945 A1 | 12/2008 | Han et al. | |
| 2009/0168240 A1 * | 7/2009 | Hsiao et al. | 360/125.02 |
| 2010/0328816 A1 * | 12/2010 | Guan et al. | 360/123.12 |

OTHER PUBLICATIONS

"One Terabit per Square Inch Perpendicular Recording Conceptual Design," by M. Mallary et al., IEEE Transactions on Magnetics, vol. 38, No. 4, Jul. 2002, pp. 1719-1724.

* cited by examiner

*Primary Examiner* — Angel A. Castro
(74) *Attorney, Agent, or Firm* — Saile Ackerman LLC; Stephen B. Ackerman (57) ABSTRACT

Improved writability and a substantial reduction in adjacent track erasure are achieved by incorporating a composite shield structure in a PMR writer. There is a trailing shield formed a certain distance above the top surface of a write pole, a leading shield formed a certain distance below the bottom surface of the write pole, and a partial side shield having a side shield section formed on each side of the write pole. The partial side shield thickness is less than that of the write pole. Each partial side shield section has a side that is parallel to the nearest write pole side and a top surface that is offset from the write pole top surface by 0 to 0.15 microns. A plurality of magnetic connections between two or more shield elements is employed to ensure correct magnetic potential. The large write pole has a flare angle of 45 to 75 degrees.

12 Claims, 5 Drawing Sheets

COMPOSITE SHIELD STRUCTURE OF PMR WRITER FOR HIGH TRACK DENSITY

This is a continuation of U.S. patent application Ser. No. 11/787016, filed on Apr. 13, 2007, now U.S. Pat. No. 7,804,666 which is herein incorporated by reference in its entirety, and assigned to a common assignee.

RELATED PATENT APPLICATIONS

This application is related to the following: Ser. No. 11/809,346, filing date May 31, 2007; and, Ser. No. 11/787,015, filing date Apr. 13, 2007; both assigned to a common assignee.

FIELD OF THE INVENTION

The invention relates to a composite shield structure for a write pole in a perpendicular magnetic recording head in which a combination of trailing shield, partial side shield, and leading shield are employed to improve writability and prevent adjacent track erasure for narrow track widths.

BACKGROUND OF THE INVENTION

Figure 1:
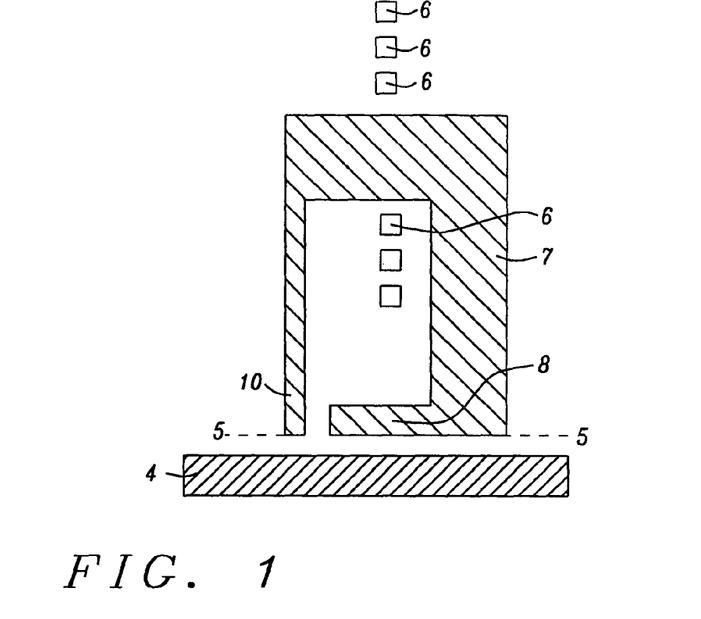
FIG. 1 is a top view of a conventional PMR writer showing the main write pole, flux return pole, magnetic recording media, and coils that generate magnetic flux.

Perpendicular magnetic recording (PMR) has been developed in part to achieve higher recording density than is realized with longitudinal magnetic recording (LMR) devices and is believed to be the successor of LMR for next generation magnetic data storage products and beyond. A single pole writer combined with a soft magnetic underlayer has the intrinsic advantage of delivering higher write field than LMR heads. A conventional PMR write head as depicted in FIG. 1 typically has a main (write) pole 10 with a small surface area (pole tip) at an air bearing surface (ABS) 5 and a flux return pole (opposing pole) 8 which is magnetically coupled to the write pole through a trailing shield 7 and has a large surface area at the ABS. Magnetic flux in the write pole layer 10 is generated by coils 6 and passes through the pole tip into a magnetic recording media 4 and then back to the write head by entering the flux return pole 8. The write pole concentrates magnetic flux so that the magnetic field at the write pole tip at the ABS is high enough to switch magnetizations in the recording media 4.

Figure 2:
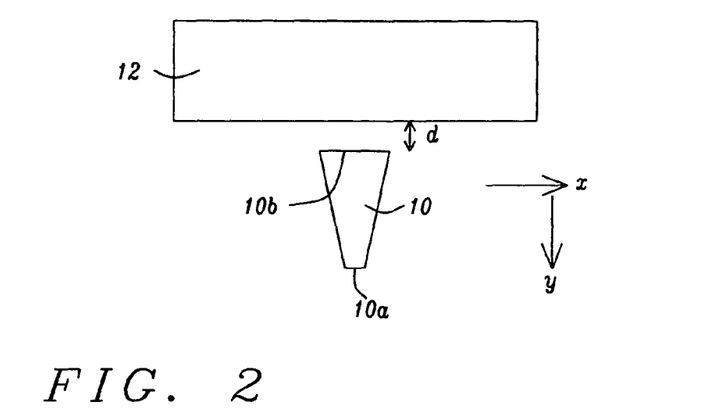
FIG. 2 is a cross-sectional view from an ABS plane showing a conventional PMR write head that has a trailing shield above a write pole.

To achieve high areal recording density with PMR technology, a key requirement for the PMR writer design is to provide large field magnitude and high field gradient in both down-track and cross-track directions. In practice, these two requirements are often traded off with each other to balance the overall performance. To improve the down-track field gradient, a trailing shield PMR writer design has been widely applied today. In FIG. 2, a view from the ABS plane is shown of a conventional trailing shield PMR writer in which a magnetic write shield 12 is placed above the top edge 10b of the write pole 10 by a certain distance d. The bottom or leading edge 10a of the write pole 10 is so designated because it is at the front of the write pole as it moves in the y or down-track direction. With this design, the down-track gradient is improved at the expense of reducing write field. In the cross-track or x direction, however, there is still a quite large detrimental fringe field (not shown) leading out from the write pole 10.

Figure 3:
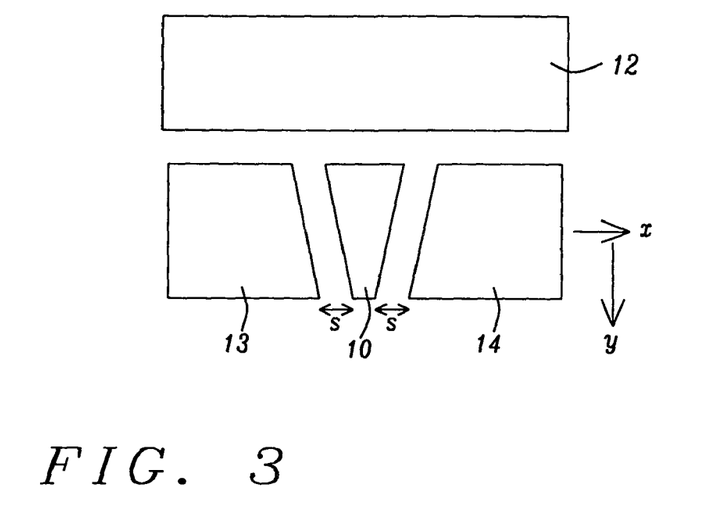
FIG. 3 is a cross-sectional view from an ABS plane that shows a prior art PMR writer design having a full side shield in addition to a trailing shield.

Referring to FIG. 3, another prior art design is illustrated that was proposed by M. Mallary and described in "One Terabit per Square Inch Perpendicular Recording Conceptual Design", IEEE, Trans. Magn., Vol. 38, July, 2002. To further improve cross-track field gradient, a full side shield writer structure is used to limit the excessive fringe field onto the adjacent track. For example, the writer in FIG. 2 may be modified by adding one side shield 13 along one side of the write pole 10 and a second side shield 14 along the opposite side of the write pole. The side shields 13, 14 have a thickness t equal to the thickness of the write pole 10. Note that the side shields may have sloped sides that parallel the slope in the write pole sides and maintain a spacing or side gap s therebetween. Depending on the size of side gap s, field magnitude could drop below the minimal performance requirement. In addition, the complexity of the structure also poses a great challenge for wafer processing.

Figure 4:
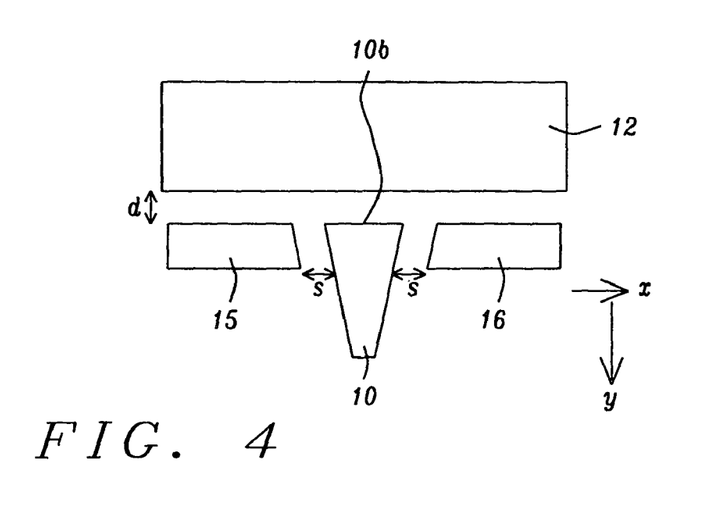
FIG. 4 is a cross-sectional view from an ABS plane that depicts a prior art PMR writer design with partial side shields and a trailing shield.
Figure 5:
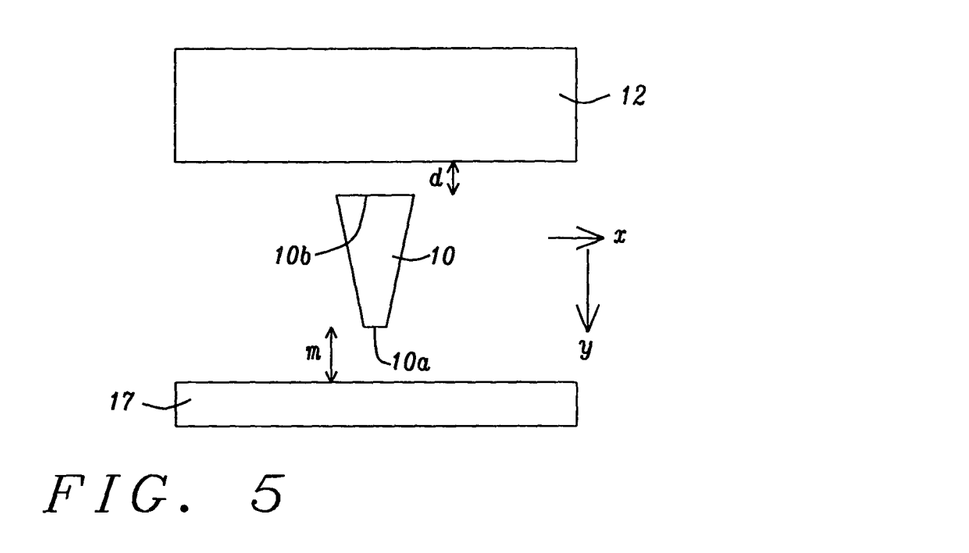
FIG. 5 is a cross-sectional view from the ABS plane showing a prior art PMR writer design with a leading shield and a trailing shield.

For easy processing, other writer structures have been proposed and include a partial side shield design in FIG. 4 and a leading shield design in FIG. 5. Referring to FIG. 4, the partial shields 15, 16 replace the full side shields in FIG. 3 and have one side coplanar with the top edge 10b of the write pole 10 and spaced a distance d from the trailing shield 12. The side of the partial shields 15, 16 facing the write pole 10 may be a side gap distance s from the write pole as in the full side shield example. However, the thickness p of the partial shields 15, 16 is substantially less than the thickness of the write pole 10. In FIG. 5, there are no side shields but a leading shield 17 is positioned a distance m from the bottom edge 10a of the write pole 10. The thicknesses of the shields 12, 17 and the magnitude of m and d may vary depending on the composition of the shields and the performance requirements.

Unfortunately, none of the prior art structures provide satisfactory control of field magnitude and field gradient in both the down-track and cross-track directions. Therefore, an improved write structure is necessary to achieve the high performance required for advanced devices with narrow track widths and high recording density.

A routine search of the prior art revealed the following references. U.S. Pat. No. 7,068,453 describes a write head with a shield structure wherein a flux return pole is connected to a full side shield by soft magnetic connections. In addition, a trailing shield contacts the side shields on opposite sides of the write pole tip. Similarly, in U.S. Pat. No. 7,070,698, a side and trailing shield structure formed around a pole tip is connected to a return pole layer through magnetic side studs. U.S. Pat. No. 7,002,775 also discloses a head for perpendicular magnetic recording with side shields that are connected to a return pole piece by two studs of ferromagnetic material.

In U.S. Pat. No. 6,842,313, a PMR writer is disclosed with a floating write shield that is spaced apart from the write pole thereby enabling the floating shield to be at a different magnetic potential than the write pole.

U.S. Patent Application Publication 2005/0237665 shows a four sided shield structure for a perpendicular write head in which full side shields are magnetically connected to a leading shield. The side shields contact a trailing shield and have a thickness greater than the write pole tip which may reduce the field magnitude.

SUMMARY OF THE INVENTION

One objective of the present invention is to provide a PMR writer structure that improves the cross-track field gradient while maintaining sufficient write field magnitude for applications including high recording density that have narrow track widths.

Another objective of the present invention is to provide a PMR writer structure according to the first objective that prevents adjacent track erasure and improves writability at narrow track width.

A still further objective of the present invention is to provide a PMR writer structure that can be more easily fabricated than a full side shield design.

According to the present invention, these objectives are achieved in an embodiment wherein a main pole layer of a PMR write head is comprised of a narrow write pole section having a pole tip at one end along an ABS. The pole tip at the ABS has a leading or bottom edge, a top or trailing edge opposite the leading edge, and two sides that connect the leading and trailing edges. The top edge may have a greater width than the bottom edge and determines the track width. The other end of the narrow write pole section is attached to a front end portion of the main pole layer where the sides flare out at an angle θ relative to the sides of the narrow write pole section. Surrounding the narrow write pole section and a section of the main pole layer is a composite shield structure comprised of a partial side shield along each of the opposite sides of the narrow write pole section, a leading shield a certain distance below the bottom edge of the write pole in the down-track position, and a trailing shield at a certain distance above the top edge, and a plurality of magnetic connections between two or more of the shield elements to ensure correct magnetic potential. In one aspect, the partial side shield on each side of the write pole is attached to a portion of the overlying trailing shield by a magnetic connection. Optionally, the partial side shield on each side of the write pole may be magnetically connected to a portion of the underlying leading shield. In a third possible configuration, the partial side shield on each side of the write pole is magnetically connected to both the leading shield and the trailing shield.

Viewed from the ABS plane, the trailing shield may have a rectangular shape with its longer sides formed parallel to the top (trailing) edge of the write pole tip. Likewise, the leading shield may have a rectangular shape with its longer sides formed parallel to the bottom edge of the write pole tip. In one embodiment, the length of the long sides in the leading and trailing shields are essentially equivalent. The narrow write pole section including the write pole tip has a first thickness along an axis that parallels the down-track direction while the partial side shields have a second thickness less than the first thickness along an axis that is parallel to the down-track direction. Each of the partial side shields has a top edge that in one embodiment is coplanar with the top edge of the write pole. Optionally, the top edges of the partial side shields may lie on a plane that is offset a certain distance below the top edge of the write pole. In a preferred embodiment, each of the partial side shields has a side facing the write pole that is essentially parallel to the nearest side of the write pole and spaced a certain distance (side gap distance) from said nearest side.

From a top view, the main pole layer has a narrow write pole section containing the write pole tip at one end and a larger main pole layer section that flares outward from the end of the narrow write pole section that is opposite the pole tip. The main pole layer flare angle is from 45 degrees to 75 degrees to help the magnetic flux to concentrate at the pole tip and to counter balance the flux leakage loss to the partial side shield. Preferably, the partial side shields conform to the narrow write pole section and to a portion of the main pole layer adjacent to the narrow write pole section. In other words, each partial side shield has a first side that is parallel to the narrow write pole section of the main pole layer and a second side connected to the first side that is parallel to a flared side of the larger main pole layer section. A third side is formed along the ABS plane and a fourth side of the partial side shield may be perpendicular to the ABS plane and parallel to the first side.

DETAILED DESCRIPTION OF THE INVENTION

The present invention is a PMR writer having main pole layer with a narrow write pole section, also referred to as a write pole, at an ABS wherein the write pole is surrounded by a composite shield structure comprising a leading shield below the bottom surface of the write pole, a trailing shield above the top surface of the write pole, a partial side shield along opposite sides of the write pole, and a plurality of magnetic connections between two or more of the shield elements. The present invention also encompasses a method for forming a composite shield structure that improves writability and prevents adjacent track erasure for narrow track widths. The drawings are provided by way of example and are not intended to limit the scope of the invention. Moreover, the elements in the figures are not necessarily drawn to scale and may have different relative sizes in an actual device.

Figure 6:
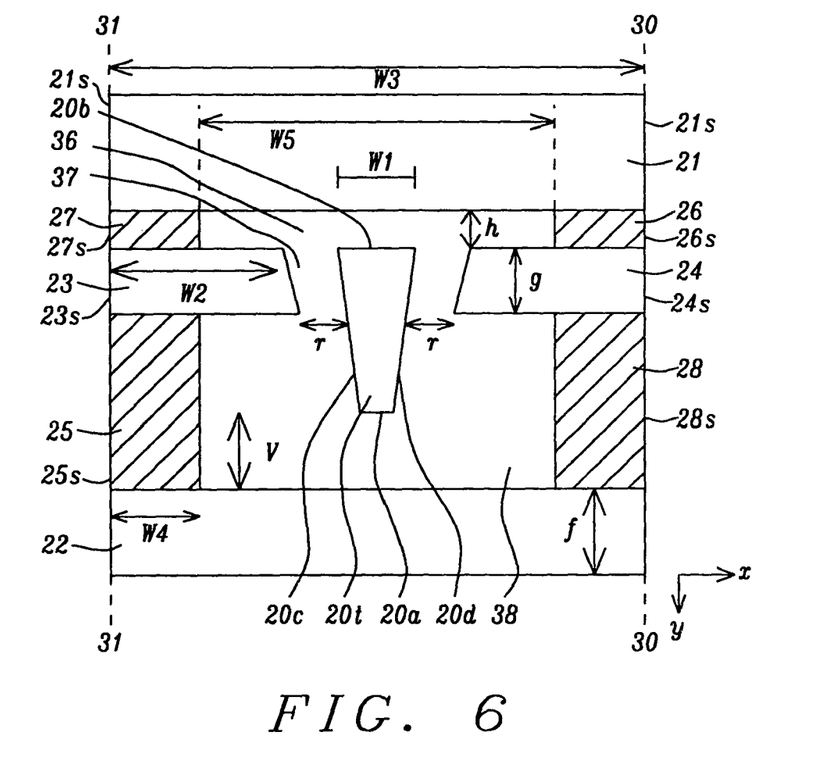
FIG. 6 is a cross-sectional view from the ABS plane showing a composite PMR writer having a leading shield, trailing shield, partial side shields, and magnetic connections according to one embodiment of the present invention.

Referring to FIG. 6, a cross-sectional view is shown from an ABS plane that represents a first embodiment of the present invention. There is a write pole having a surface (pole tip 20t) at the ABS comprised of a bottom edge 20a, a top edge 20b, and two sides 20c, 20d that is formed on a substrate (not shown) that may be a separation layer made of $Al_2O_3$ between a read head and a write head in a separated PMR read-write head, for example. However, the PMR writer is not limited to a separated PMR read-write head and may encompass other PMR writer configurations as appreciated by those skilled in the art. It should be understood that the write pole tip 20t has a bottom surface that terminates in the bottom edge 20a, and a top surface that terminates in the top edge 20b at the ABS. Furthermore, the substrate may be part of a slider (not shown)

formed in an array of sliders on a wafer. After the PMR write head is completed, the wafer is sliced to form rows of sliders. Each row is typically lapped to afford an ABS before dicing to fabricate individual sliders that are used in a magnetic recording device.

Figure 8:
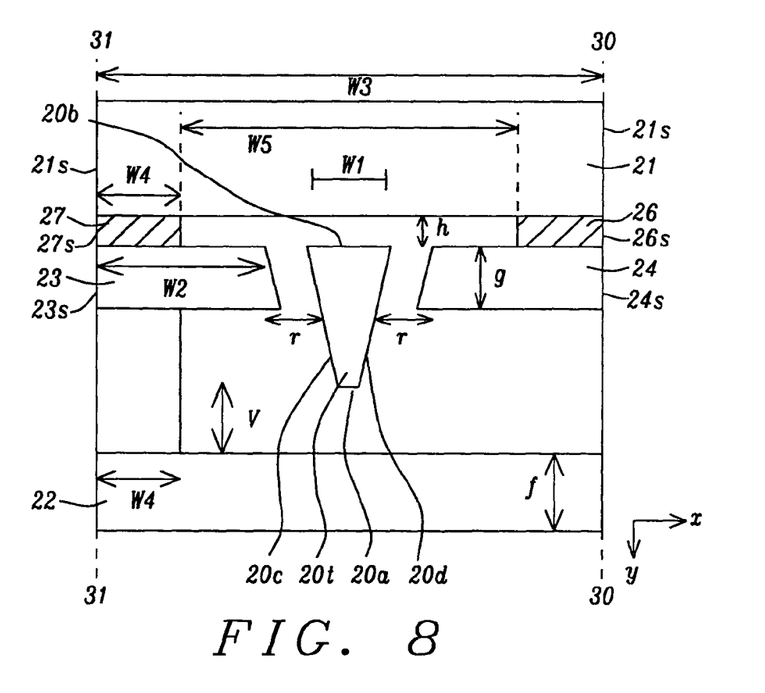
FIG. 8 is a cross-sectional view from the ABS plane showing a composite PMR writer having a leading shield, trailing shield, partial side shields, and magnetic connections according to a third embodiment of the present invention.

The main pole layer 20 has a narrow section (write pole) 20n that terminates in the write pole tip 20t at the ABS from a top view in FIG. 8. There is also a larger section 20m with flared sides 20r, 20s connected to the narrow section 20n along the plane 32-32. The main pole layer 20 may be deposited by an electroplating method and may be comprised of a material such as CoNiFe or FeCo that has a high saturation magnetic flux density (Bs) and a plated thickness of about 0.7 to 0.9 microns.

Returning to the exemplary embodiment in FIG. 6, the pole tip 20t has a top edge 20b having a width $w_1$ at the ABS that is also known as the track width. In addition, there are two sides 20c, 20d that connect the ends of the top edge 20b and bottom edge 20a to form an inverted trapezoidal shape. The track width $w_1$ of 0.05 to 0.2 microns is wider than the width of the bottom edge 20a and is typically determined by an ion milling process that removes excess material from the sides of the main pole layer 20. A chemical mechanical polish (CMP) step is typically employed to form a smooth write pole surface (tip) along the ABS plane. The thickness of the pole tip 20t is defined as the distance between the top edge 20b and bottom edge 20a along a line that is parallel to the y-axis and is about 0.15 to 0.30 microns. The top edge 20b and bottom edge 20a are part of a top write pole surface and bottom write pole surface, respectively, that are oriented perpendicular to the ABS plane.

There is a trailing shield 21 above the pole tip 20t having two long sides formed parallel to the top edge 20b of the pole tip and with a width $w_3$ in a cross-track (x-axis) direction. The long side that is closer to the write pole 20 is the bottom surface of the trailing shield 21 and is separated from the top edge 20b of the write pole by a distance h that is preferably about 0.03 to 0.10 microns. In one embodiment, the trailing shield 21 has a rectangular shape and one short side 21s of the trailing shield 21 lies on a plane 30-30 and the second short side 21s lies on a plane 31-31 wherein both of the aforementioned planes are parallel to the y-axis. The planes 30-30 and 31-31 are typically formed by a CMP process as appreciated by those skilled in the art. In addition, there is a leading shield 22 having a thickness f of about 0.2 to 5.0 microns along the ABS plane. In one embodiment, the leading shield 22 has a rectangular shape with two long sides formed parallel to the bottom edge 20a and having a width $w_3$. The long side (top surface) nearest the write pole 20 is positioned a distance v of about 0.05 to 0.15 microns from the bottom edge 20a. One short side 22s lies on the plane 31-31 while the second short side 22s lies on the plane 30-30.

The present invention also encompasses a partial side shield comprised of a first section 23 with a side 23s on the plane 31-31 and a second section 24 on the opposite side of the pole tip 20t wherein the second section has a side 24s on the plane 30-30. In one aspect, the two sections 23, 24 each have a top and bottom surface, a side along a plane 31-31 or 30-30, and a fourth side that is aligned essentially parallel to the nearest pole tip side 20c, 20d, respectively, and spaced a distance r of about 0.04 to 0.10 microns from the nearest side. The distance r is also known as the side gap spacing. Note that the partial side shield has a thickness g in the down-track direction of about 0.05 to 0.2 microns which is less than the thickness of the pole tip 20t in the down track direction along the ABS plane between top edge 20b and bottom edge 20a. The top surface of the sections 23, 24 may be coplanar with the top edge 20b of the pole tip and top surface of narrow section 20n (not shown). Optionally, the top surface of sections 23, 24 may be offset by a distance between 0 and 0.15 microns below the top edge 20b of the pole tip 20. The top surface of sections 23, 24 has a width $w_2$ of 0.5 to 30 microns which is less than the width of the bottom surface of the partial side shield.

In one embodiment, the main pole layer including pole tip 20t, trailing shield 21, leading shield 22, and partial side shield sections 23, 24 may be made of CoNiFe, FeCo, NiFe or other soft magnetic materials. One fabrication sequence for forming the aforementioned magnetic elements is provided in related Headway application HT06-017 which is herein included by reference in its entirety. The space 36 between the write pole tip 20t and trailing shield 21 may be filled with a write gap (WG) made of $Al_2O_3$, silicon oxide, or NiCu, for example. The space in the side gap region 37 may be comprised of a trilayer configuration (not shown) having a lower side gap layer, a middle CMP stopper layer, and an upper magnetic seed layer that are deposited by an atomic layer deposition (ALD) method or the like. Region 38 between the partial side shields 23, 24 and the leading shield 22 may be comprised of a lower alumina layer (not shown) formed by a PVD method, for example, and a metal mask made of Ta, Ru, NiCr, Ti, or the like formed on the lower alumina layer.

The first embodiment of the present invention further encompasses magnetic side connections hereafter referred to as side connections between one or more of the magnetic shield elements described above to ensure correct magnetic potential. The side connections may be comprised of the same soft magnetic material as in the main write pole layer, for example. Side connections may be fabricated by plating up a plurality of via holes (not shown) that are formed between various shield elements during the process sequence. For example, a first set of vias may be formed between the leading shield 22 and partial side shields 23, 24 and then filled to form the side connections 25, 28. During a separate process sequence, a second set of vias may be formed between the partial side shields 23, 24 and the trailing shield 21 and then filled to form side connections 26, 27.

In the embodiment represented by FIG. 6, there is a side connection 26 formed between the top surface of the partial side shield section 24 and the trailing shield 21 and a side connection 27 formed between the top surface of the partial side shield section 23 and the bottom surface of trailing shield 21. Side connections 26, 27 have a thickness h and a width $w_4$ less than $w_2$. Preferably, the distance $w_5$ between side connections 26, 27 in a direction parallel to the x-axis is from about 0.5 to 10 microns. Side connection 26 has a side 26s formed on the plane 30-30 and side connection 27 has a side 27s formed on the plane 31-31. A second set of side connections is formed between the bottom surface of the partial side shield and the leading shield 22. Side connection 25 connects the bottom surface of partial side shield section 23 to the leading shield 22 and side connection 28 is attached to the bottom surface of partial side shield 24 and the top surface of leading shield 22. In one embodiment, side connection 25 has a width $w_4$ and a side 25s on the plane 31-31 while side connection 28 has a side 28s on the plane 30-30 and a width $w_4$. Although the width of all side connections are equivalent in the exemplary embodiment, the present invention also encompasses a composite shield structure wherein the side connections 26, 27 may have a different width than the side connections 25, 28. The first embodiment is preferred because the two sets of magnetic connections 26,27 and 25,28 provide the optimum control of magnetic potential in the magnetic elements 20-24.

Figure 7:
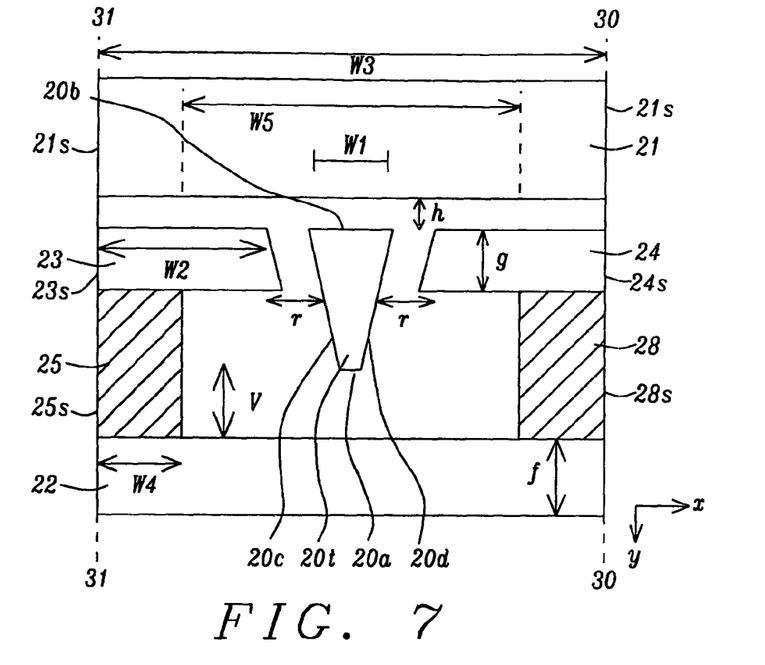
FIG. 7 is a cross-sectional view from the ABS plane showing a composite PMR writer having a leading shield, trailing shield, partial side shields, and magnetic connections according to a second embodiment of the present invention.

Referring to FIG. 7, a second embodiment of the composite shield structure according to the present invention is shown. The structure is the same as previously described with respect to FIG. 6 except that the side connections 26, 27 are omitted. In this case, side connections 25, 28 provide control of magnetic potential in partial side shield sections 23, 24 and in leading shield 22.

Referring to FIG. 8, a third embodiment of the composite shield structure according to the present invention is shown. The structure is the same as previously described with respect to FIG. 6 except that the side connections 25, 28 are omitted. In this case, side connections 26, 27 provide magnetic potential control for partial side shields 23, 24 and trailing shield 21.

Figure 9:
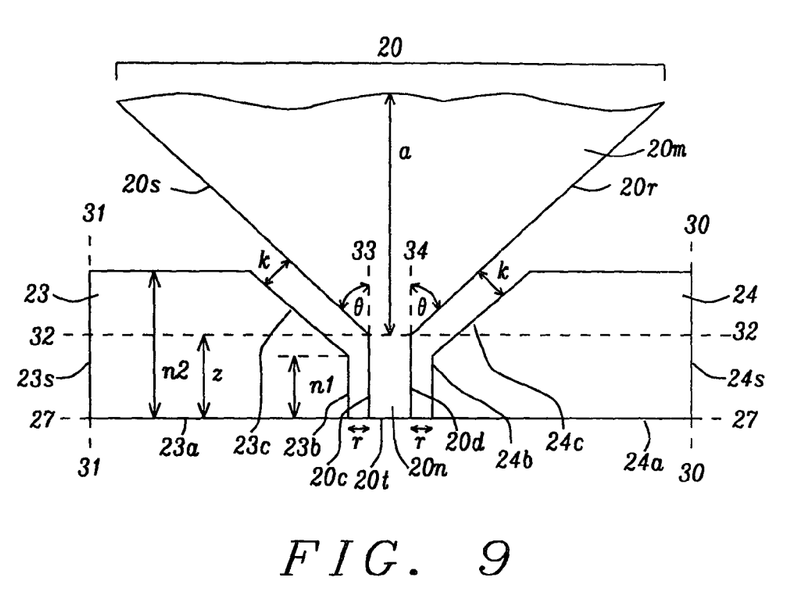
FIG. 9 is a top view of the PMR writer in FIG. 5 in which the trailing shield has been removed to show the write pole and partial side shields.

Referring to FIG. 9, a top view of the main pole layer 20, narrow section 20n, partial side shield sections 23, 24, and the larger section 20m of the main pole layer is illustrated. The trailing shield 21 above the pole tip 20t has been removed to simplify the drawing. The narrow section 20n extends from the pole tip 20t at the ABS plane to the plane 32-32 where the larger section 20m of the main pole layer flares outward at an angle θ with respect to the dashed lines 33, 34 that are extensions of the pole tip sides 20c, 20d, respectively. The angle θ is preferably between 45 degrees and 75 degrees to help concentrate the magnetic flux from the main pole layer at the pole tip 20t and to counter balance the flux leakage loss to the partial side shield sections 23, 24. However, without the composite shield described herein or a full side shield, the large flare angle θ would cause too much fringe field at the adjacent track.

The process flow during fabrication is simplified by making the partial side shield sections 23, 24 conformal with the flared sides 20r, 20s of the main pole layer. In other words, partial side shield section 23 has a side 23c that is essentially parallel to a portion of the flared side 20s and separated from the side 20s by a side gap distance k that may be equal to r. Likewise, partial side shield section 24 has a side 24c that is essentially parallel to a portion of the flared side 20r and separated from the side 20r by a distance k. Partial side shield sections 23, 24 also have sides 23b, 24b, respectively, that are perpendicular to the ABS plane 27-27 and parallel to the longer sides in the narrow section 20n. In addition, there are sides 23s, 24s as mentioned previously that are formed along the planes 31-31 and 30-30, respectively. In the exemplary embodiment, the length $n_1$ of the sides 23b, 24b is from 0 to about 0.2 microns and is less than the distance z of about 0 to 0.2 microns that separates plane 32-32 from the ABS plane 27-27 whereas length $n_2$ of the sides 23s, 24s is greater than the distance z which is also known as the neck height. In current commercial PMR writers, the neck height is typically greater than 0.1 micron and the flare angle θ is below 45 degrees.

Figure 10:
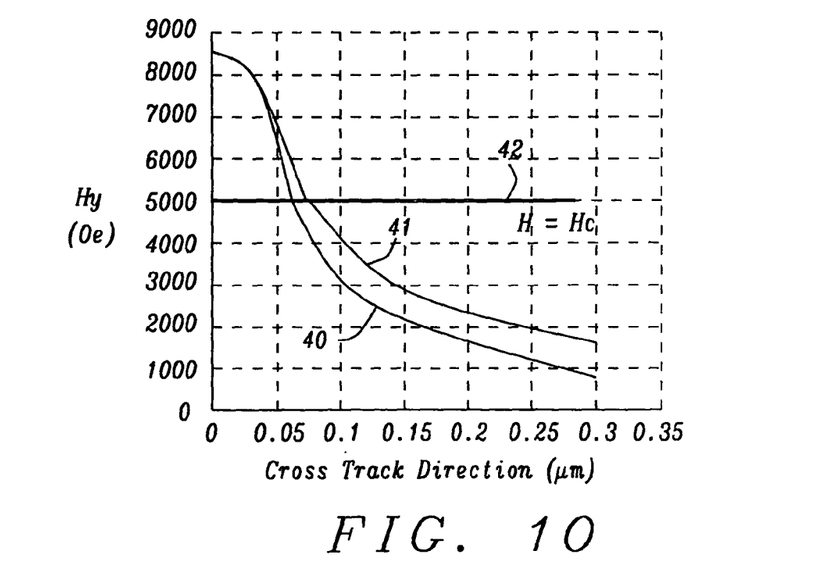
FIG. 10 is a graph illustrating the perpendicular field vs. distance to the writer pole center for a PMR writer according to one embodiment of the present invention.

One advantage provided by the composite shield structure of the present invention is shown by a simulation in FIG. 10 where the magnitude of the perpendicular field component (Hy) is plotted as a function of cross track direction or distance to the write pole (pole tip) center along the x-axis. The horizontal line 42 in the plot is the constant H=Hc where Hc is media coercivity. Magnetic write width (MWW) is determined by the intercepting point of the field profile (line 40 or line 41) with the horizontal line 42. The results represented by solid line 40 for the composite shield design of the first embodiment show essentially the same field magnitude of about 8500 Oe at a center track position and better cross-track gradient than the prior art design having a trailing shield only as represented by the dashed line 41. In other words, the steeper field gradient for line 40 enables a smaller MWW for the composite shield design. As a result, a PMR writer that incorporates a composite shield structure according to the present invention will have improved writability and less erasure of adjacent tracks at narrow track width. Another advantage of the composite shield structure represented by embodiments in FIGS. 6-9 is that the fabrication process can be accomplished with existing methods and tools and in a simpler fashion than for the full side shield design as indicated earlier.

While this invention has been particularly shown and described with reference to, the preferred embodiment thereof, it will be understood by those skilled in the art that various changes in form and details may be made without departing from the spirit and scope of this invention.

We claim:

1. A composite shield structure in a magnetic recording device having a main pole layer with a write pole terminating at a pole tip at an air bearing surface (ABS) wherein said write pole has a top surface that is the top edge of the pole tip which has a track width in a cross-track direction, a bottom surface that is the bottom edge of the pole tip which is also the leading edge as the pole tip moves over a recording media, and two sides that connect the top and bottom surfaces, comprising:
    (a) a trailing shield having a bottom surface formed a certain distance above said top surface of the write pole and top edge of the pole tip, and two sides at the ABS that are parallel to the down track direction;
    (b) a leading shield having a top surface formed a certain distance below said bottom surface of the write pole and bottom edge of the pole tip, and two sides at the ABS that are parallel to the down-track direction;
    (c) a partial side shield having a section formed on each side of the write pole wherein each section has a top surface having a width in a cross-track direction, a bottom surface parallel to the top surface, a side parallel to the down-track direction, and a side that is essentially parallel to the nearest side of the write pole and spaced a second distance from said nearest side; and
    (d) a plurality of magnetic connections between two or more of the aforementioned shield elements.

2. The composite shield structure of claim 1 wherein a first side of the trailing shield, a first side of the leading shield, and the side of a first partial shield section that is parallel to the down-track direction lie along a first plane, and a second side of the trailing shield, second side of the leading shield, and the side of the second partial side shield section that is parallel to the down-track direction lie along a second plane, said write pole is formed between the two planes.

3. The composite shield structure of claim 2 wherein there is a first magnetic connection formed between the top surface of the first partial side shield section and the bottom surface of the trailing shield, a second magnetic connection between the top surface of the second partial side shield section and the bottom surface of the trailing shield, a third magnetic connection between the bottom surface of the first partial side shield section and the top surface of the leading shield, and a fourth magnetic connection between the bottom surface of the second partial side shield section and the top surface of the leading shield wherein said magnetic connections have a width that is less than the width of the top surface of the first or second partial side shield sections, said first and third magnetic connections have a side along the first plane, and said second and fourth magnetic connections have a side along the second plane.

4. The composite shield structure of claim 3 wherein the first, second, third, and fourth magnetic connections have the same width.

5. The composite shield structure of claim 3 wherein said first and second magnetic connections have a different width than said third and fourth magnetic connections.

6. The composite shield structure of claim 1 wherein said plurality of magnetic connections is comprised of via holes that are filled with a soft magnetic material.

7. A write head in a magnetic recording device, comprising:
   (a) a main pole layer having a first section with a pole tip at an ABS plane, a thickness in a down-track direction, two sides formed perpendicular to the ABS, a top surface, and a bottom surface, and a second section formed a certain distance from the ABS wherein the second section has one side that flares outward at an angle θ relative to a first side of the first section and a second side that flares outward at an angle θ relative to a second side of the first section at an end opposite the ABS; and
   (b) a composite shield structure comprised of:
      (1) a trailing shield having a bottom surface formed a certain distance above said top surface of the first section, and two sides at the ABS that are parallel to the down-track direction;
      (2) a leading shield having a top surface formed a certain distance below said bottom surface of the first section, and two sides at the ABS that are parallel to the down-track direction;
      (3) a partial side shield having a thickness less than the thickness of the first section, and a side shield section formed on each side of the first section wherein each side shield section has a top surface having a width at the ABS in a cross-track direction, a bottom surface parallel to the top surface, a side parallel to the down-track direction, a side that is parallel to the nearest side of the first section and spaced a second distance from said nearest side, and a side that is essentially parallel to the nearest flared side of the second section; and
      (4) a plurality of magnetic connections formed between two or more of the aforementioned shield elements.

8. The write head of claim 7 wherein a first side of the trailing shield, a first side of the leading shield, and the side of a first side shield section that is parallel to the down-track direction lie along a first plane that is perpendicular to the ABS, and a second side of the trailing shield, second side of the leading shield, and the side of the second side shield section that is parallel to the down-track direction lie along a second plane that is perpendicular to the ABS, said first section is formed between the two planes.

9. The write head of claim 8 wherein there is a first magnetic connection formed between the top surface of the first side shield section and the bottom surface of the trailing shield, a second magnetic connection between the top surface of the second side shield section and the bottom surface of the trailing shield, a third magnetic connection between the bottom surface of the first side shield section and the top surface of the leading shield, and a fourth magnetic connection between the bottom surface of the second side shield section and the top surface of the leading shield wherein said magnetic connections have a width that is less than the width of the top surface of the first or second side shield sections, said first and third magnetic connections have a side along the first plane, and said second and fourth magnetic connections have a side along the second plane.

10. The write head of claim 9 wherein the first, second, third, and fourth magnetic connections have the same width.

11. The write head of claim 9 wherein said first and second magnetic connections have a different width than said third and fourth magnetic connections.

12. The write head of claim 7 wherein said plurality of magnetic connections is comprised of via holes that are filled with a soft magnetic material.

* * * * *